United States Patent [19]
Lombardi et al.

[11] Patent Number: 5,932,290
[45] Date of Patent: Aug. 3, 1999

[54] METHODS FOR THE PREPARATION OF THREE-DIMENSIONAL BODIES

[75] Inventors: John Lombardi; Anthony Mulligan; Paul Calvert; Peter Creegan; Kevin Stuffle, all of Tucson, Ariz.

[73] Assignee: Advanced Ceramics Research, Tucson, Ariz.

[21] Appl. No.: 08/938,039

[22] Filed: Sep. 26, 1997

Related U.S. Application Data

[63] Continuation of application No. 08/286,927, Aug. 8, 1994, abandoned.

[51] Int. Cl.$^6$ ........................................................ B05D 3/00
[52] U.S. Cl. ................................................................ 427/385.5
[58] Field of Search ............................... 427/372.2, 226, 427/261, 374.1, 376.1, 379, 385.5, 393.5, 407.1, 868.26

[56] References Cited

U.S. PATENT DOCUMENTS

| | | |
|---|---|---|
| 4,477,327 | 10/1984 | Cassatta et al. . |
| 4,575,330 | 3/1986 | Hull . |
| 4,722,962 | 2/1988 | Shay . |
| 4,894,194 | 1/1990 | Janney . |
| 5,028,362 | 7/1991 | Janney . |
| 5,121,329 | 6/1992 | Crump . |
| 5,340,433 | 8/1994 | Crump .................................... 156/578 |
| 5,505,990 | 4/1996 | Sagawa ................................ 427/376.1 |

*Primary Examiner*—Christopher Henderson
*Attorney, Agent, or Firm*—Leydig, Voit & Mayer, Ltd.

[57] ABSTRACT

The present invention generally relates compositions and methods for the preparation of three-dimensional bodies e.g., green bodies, ceramic-loaded green bodies, and polymer matrix composites by the controlled, sequential deposition of layers of material upon one another The method for preparing a green body comprises depositing a liquid composition having a viscosity of at least about 10 poise and comprising thermally-polymerizable components onto a base in a predetermined pattern to form a layer of the liquid composition on the base. Subsequently, at least one further layer of the liquid composition is deposited on a previously-formed layer in a predetermined pattern to form a multi-layered intermediate and, then, the multi-layered intermediate is heated to cause the thermally-polymerizable components to polymerize, providing the three-dimensional green body. Another method of the present invention provides a method for reinforcing a green body with fibers. More than simply reinforcing the body, however, this particular aspect of the present invention allows the alignment of reinforcing fibers in the body to be controlled. A further aspect of the present invention is the discovery of a novel composition which may be used to provide a three-dimensional polymer matrix composite using free-formation methods. This composition comprises at least one urethane acrylate oligomer, at least one vinyl monomer, and has a viscosity of at least 10 poise.

27 Claims, 2 Drawing Sheets

METHODS FOR THE PREPARATION OF THREE-DIMENSIONAL BODIES

This is a continuation of application(s) Ser. No. 08/286,927 filed Aug. 8, 1994 now abandoned.

This invention was made with Government support under Contract Numbers NAS8-39803, DAAH01-92-C-R309, and DAAH01-94-C-R007 awarded by the Department of Defense. The Government has certain rights in this invention.

TECHNICAL FIELD OF THE INVENTION

The present invention relates to the preparation of three-dimensional bodies by the controlled, sequential deposition of layers of material upon one another.

BACKGROUND OF THE INVENTION

In the design and development of machine parts, it is often desirable to prepare a prototype of a newly created part. This allows the manufacturer to ensure that the new part will properly integrate with the other parts with which it interacts, or conversely allows changes to be incorporated into the part design if problems arise, prior to the creation of expensive commercial production tooling. As the design and development of parts can often become a trial-and-error process, the ability to quickly and accurately prepare prototypes is very desirable. Further, prototypes that are created should possess sufficient strength to withstand chipping, cracking, and other structural problems that may arise during testing of the part with other components, and even during normal handling of the part.

Various methods which provide for the preparation of such prototypes and, more generally, of three-dimensional bodies of a predetermined size and shape, are known in the art. Several of these methods involve the controlled, sequential deposition of layers of material upon one another.

One method of forming three-dimensional bodies by such a method is stereolithography. A description of stereolithography can be found in U.S. Pat. No. 4,575,330. In this patent, a low viscosity bath of a particular photopolymerizable homogenous monomer solution is prepared. A platform, which moves relative to the surface of the solution, is located in the solution. Upon operation, the platform is lowered until it resides slightly below the surface of the solution. A movable laser, which is mounted onto a CAD-CAM controlled head, is located over the solution. The laser is selected so that, when it is activated and moved with respect to the platform, a polymer layer is created from the homogenous monomer solution. In other words, the monomer polymerizes locally when the light emitted by the laser reaches the monomer solution. The platform is then lowered until it is slightly below the surface of the solution, so that the low viscosity homogenous monomer solution flows over the photopolymerized layer. The process is then repeated until a plurality of layers, and therefore the desired three-dimensional body, is formed.

Such systems are limited, however, in that only photopolymerizable liquids can be used. This further requires the use of a laser to effect polymerizations making the apparatus used to conduct this method relatively expensive. Moreover, as a practical matter, only a single liquid composition is able to be used to prepare a body. In addition, it would be difficult to prepare a ceramic prototype part using this method because it would be difficult to achieve adequate dispersion of such particles throughout the liquid and, even if this problem were overcome, the ceramic particles would scatter the impinging laser beam. Further, the successive layers may only be formed in a single, horizontal plane.

Another method for the preparation of three-dimensional bodies which addresses some of the aforementioned deficiencies is described by U.S. Pat. No. 5,121,329. This method utilizes a spool fed filament, e.g. wax, a thermoplastic resin, or a metal, through a heated, fine diameter, nozzle. As the material passes through the nozzle, it melts. The nozzle, and therefore the molten material, is then moved relative to a surface so a layer of the material is deposited onto the surface in a predetermined pattern. The material is selected so that it solidifies when it contacts the relatively cool surface. Deposition of the material is repeated a number of times until a desired three-dimensional object, comprised of a number of such layers (one upon the other), is prepared.

This system, however, is limited as to the types of materials that can be used to form the body. More specifically, "meltable" materials are required to be used, such as thermoplastic resins, metals, waxes, and the like. Further, parts prepared using those materials and methodology typically exhibit poor mechanical properties, requiring careful handling to avoid damage. In addition, it is difficult to prepare parts having particulate loading because the melt viscosity of the material increases significantly with filler content. Another problem is that parts prepared using this method will generally further exhibit a certain degree of warpage.

In view of the foregoing limitations of known methods for providing three-dimensional bodies, e.g., prototype machine parts, of varying shapes, one object of the present invention is to provide a composition and method which allow the preparation of three-dimensional green bodies of varying shapes.

A further object of the present invention is to provide a composition and method for preparing three-dimensional bodies which, regardless of their shape, exhibit enhanced physical properties as compared to bodies of the same shape prepared using conventional compositions and methods.

Another object of the present invention is to provide a composition and method which allow the preparation of three-dimensional bodies of varying shapes using a relatively wider range of materials as the primary body component as compared to materials used in conventional compositions and methods.

Yet another object of the present invention is to provide a composition and method for the preparation of three-dimensional bodies which bodies possess a relatively lower level of warpage as compared to bodies prepared using known methods An additional object of the present invention is to provide a method which allows for the preparation of three-dimensional bodies having relatively high levels of particulate loading while avoiding the problems associated with such loading using prior art compositions and methods Another object of the present invention is to provide a method which provides a means for the preparation of a three-dimensional body which possesses predetermined specific, and different, mechanical properties in one area of the body as compared to a different area of the same body.

These and other objects and advantages of the present invention, as well as additional inventive features, will be apparent from the description of the invention provided herein.

SUMMARY OF THE INVENTION

The present invention provides novel free-form methods, and related compositions, for preparing three-dimensional bodies of varying shapes. Such bodies, and particularly those that are ceramic and/or fiber reinforced, have potential uses as biomedical implants, electronic substrate materials, and in various aerospace applications.

One aspect of the present invention provides a method for preparing a three-dimensional green body. The method comprises depositing a liquid composition having a viscosity of at least about 10 poise and comprising thermally-polymerizable components onto a base in a predetermined pattern to form a layer of the liquid composition on the base. Subsequently, at least one further layer of the liquid composition is deposited on a previously-formed layer in a predetermined pattern to form a multi-layered intermediate and, then, the multi-layered intermediate is heated to cause the thermally-polymerizable components to polymerize, providing the three-dimensional green body. The green body provided by this method exhibits superior mechanical properties as compared to green bodies prepared using known compositions, as well as compared with methods in which each layer undergoes a phase transition immediately after deposition, i.e., prior to the complete deposition of the entire multi-layered body.

Another aspect of the present invention provides a method for reinforcing a green body with fibers. More than simply reinforcing the body, however, this particular aspect of the present invention allows the alignment of reinforcing fibers in the body to be controlled. Such directionally-aligned-fiber reinforcement contributes to the body's increased mechanical strength, not only as compared to bodies having no such fiber reinforcement, but over a body which has randomly oriented fibers.

This aspect of the present invention comprises passing a fiber-laden suspension having a viscosity of at least about 10 poise and comprising fibers and thermally-polymerizable components through a flow passage of a nozzle. The flow passage of the nozzle is configured so that the fibers are oriented substantially parallel to each other and substantially in the direction of suspension movement relative to the nozzle as the suspension passes through the flow passage. As the suspension exits the nozzle, it is deposited onto a base in a predetermined pattern to form a layer of the suspension on the base. Simultaneously with the deposition of the suspension onto the base, the nozzle and base are moved relative to one another so that the fibers in the deposited layer are aligned in a predetermined direction. Subsequently, the layer is heated to cause the thermally-polymerizable components to polymerize, thereby providing a three-dimensional body having directionally-aligned-fiber reinforcement.

It was found that one of the benefits of using such high viscosity compositions is that the fibers, if oriented within the composition prior to deposition, will remain in substantially that same orientation prior to polymerization of the polymerizable components (at which time the location and orientation of the fibers is finally fixed).

A further aspect of the present invention is the discovery of a novel composition which may be used to provide a three-dimensional polymer matrix composite using free-formation methods. The inventive composition comprises at least one urethane acrylate oligomer, at least one vinyl monomer, and has a viscosity of at least 10 poise.

As mentioned previously, another aspect of the present invention is the use of the foregoing novel composition to prepare a three-dimensional polymer matrix composite. This method comprises depositing a liquid composition having a viscosity of at least about 10 poise and comprising thermally-polymerizable components, which components comprise at least one urethane acrylate oligomer and at least one vinyl monomer, onto a base in a predetermined pattern to form a layer of the liquid composition on the base. The layer is subsequently heated to cause the thermally-polymerizable components to polymerize thereby providing the three-dimensional polymer matrix composite.

The invention may best be understood with reference to the accompanying drawings wherein an illustrative embodiment is shown and in the following detailed description of the preferred embodiments.

DESCRIPTION OF THE PREFERRED EMBODIMENTS

Figure 1:
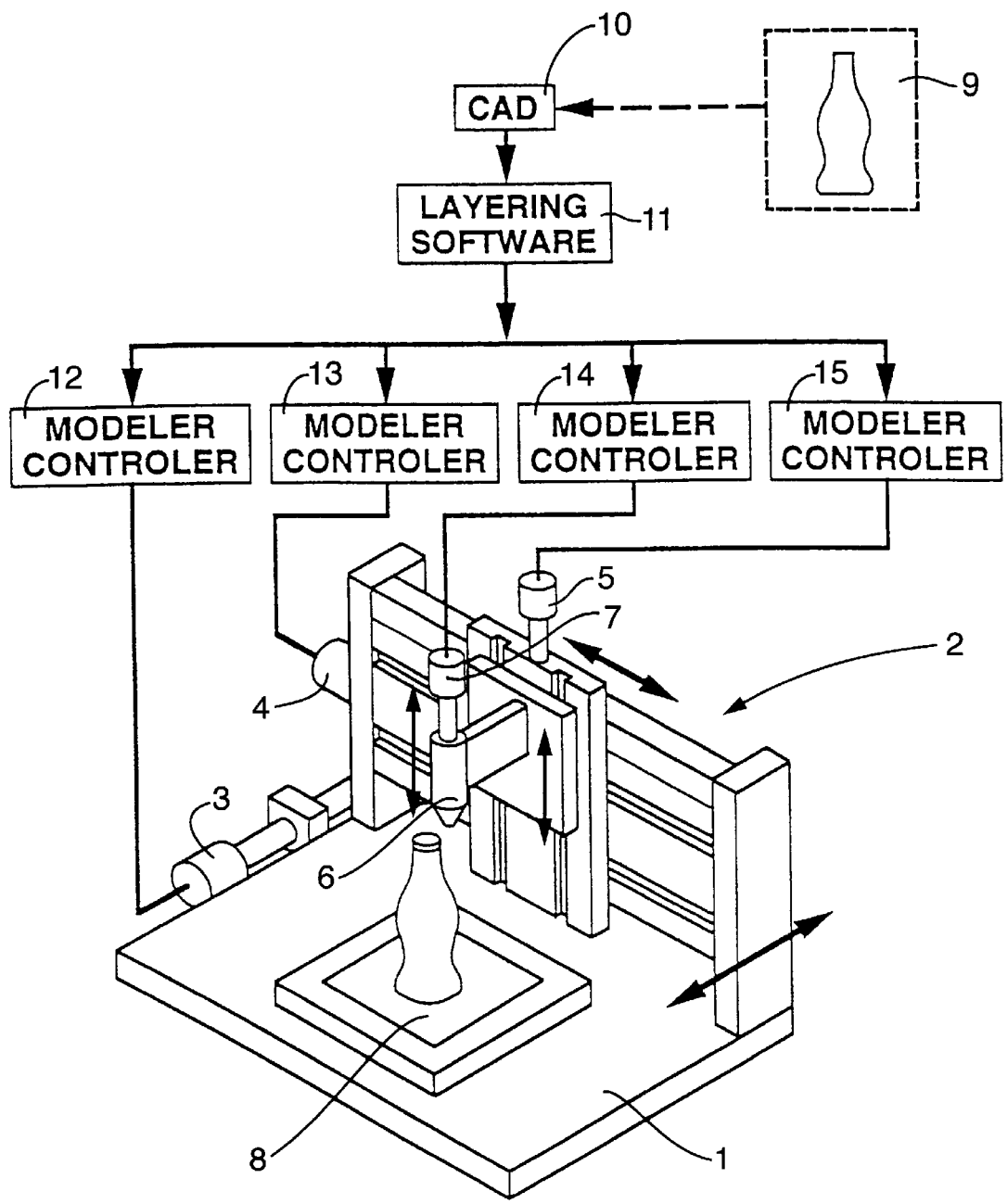
FIG. 1 illustrates a perspective view of an example of an apparatus that may be used in connection with the methods of the present invention with arrows indicating the directions in which the various components of the apparatus may move.

The present invention comprises several aspects, all relating to methods and compositions useful in the preparation of three-dimensional bodies, e.g., green bodies and polymer matrix composites, using free-forming techniques.

One aspect of the present invention provides a method for preparing such a three-dimensional green body. This method comprises depositing a liquid composition onto a base in a predetermined pattern to form a layer of the liquid composition on the base. The liquid composition should have a viscosity of at least about 10 poise, and should further comprise thermally-polymerizable components. Subsequently, at least one further layer of the liquid composition is deposited onto a previously-formed layer in a predetermined pattern to form a multi-layered intermediate. After the intermediate is formed, it is heated to cause the thermally-polymerizable components to polymerize, thereby providing a three-dimensional green body.

The liquid composition used in the foregoing method may be in any suitable form, e.g., as a dispersion, emulsion, or solution of the thermally-polymerizable components. If the polymerizable components are provided as solids, a liquid carrier, e.g., water plus an emulsifier or dispersant, or a solvent for the components, may be added to provide the requisite "liquid" for the liquid composition.

The thermally-polymerizable components may comprise a variety of monomers and/or oligomers, so long as the components, when polymerized, provide a self-supporting green body. Advantageously, however, the components should be selected so that the degree of shrinking of the intermediate upon polymerization is minimal and, further, so that polymerization is able to occur relatively rapidly after formation of the intermediate The discovery that thermally-polymerizable components could be used to prepare three-dimensional objects using free-form methodology was surprising particularly in view of the relatively narrow range of materials used in known methods. One of the aspects of this success was the recognition that such monomers and/or oligomers, when present in a liquid composition, could be used if the viscosity of the liquid composition was sufficiently high, above at least about 10 poise.

Although the solids present in the liquid composition may increase the viscosity of the composition to a certain degree, it will typically be necessary to introduce a viscosifier into the composition in an amount sufficient to provide the composition with the requisite viscosity level. It was recognized that this viscosity level would ensure that the deposited composition remains in substantially the same shape, and the various components remain substantially well distributed throughout the deposited composition, from the time it was deposited until the remainder of the body preparation steps were completed. As the minimum viscosity at which this was found to occur was about 10 poise, the liquid composition should possess a viscosity of at least that level. Even after raising the viscosity to this relatively high level, it was surprisingly discovered that the liquid composition remained usable in the methods of the present invention.

When one desires to prepare a multi-layered structure from the liquid composition, the viscosity of the composition should advantageously be raised to a level which allows any layer of the composition to retain its shape even as additional layers of the composition are laid up upon it. It was determined that, preferably, the viscosity of the composition should be at least about 100 poise and, most preferably, it should be at least about 200 poise.

Prior to deposition, it is also preferred that the liquid composition be degassed. This procedure prevents gas bubbles from being trapped within the intermediate and, ultimately, the green body. The presence of excessive hollows in the green body which remain after polymerization of the intermediate due to the inclusion of gas bubbles constitute sites at which the formation of fractures and other mechanical failures can occur. This degassing of the viscous liquid can be undertaken by any suitable procedure known in the art.

When depositing the liquid composition, it is preferred that a positive-displacement extruder is used, with a screw-activated, piston-type positive displacement extruder being most preferred. This device provides a steady flow rate of liquid composition, even under high viscosity conditions Without such steady flow rates, the layers formed during the deposition will not have uniform dimensions, resulting in the preparation of an improperly-sized product.

After the liquid composition is deposited, and the intermediate formed, it must be heated in order to initiate polymerization of the thermally-polymerizable components present therein. Any means can be used to provide the requisite heat, e.g., by placing the intermediate into an oven, by heating the base (preferably after covering the intermediate with a glass or ceramic dome to assist in uniform heating), or by subjecting the composition to microwaves. Use of an oven is preferred due to its ability to provide uniform heating of the entire intermediate, although heating the intermediate while covered on the base is more practical because no movement of the intermediate, which could cause unwanted, accidental movement of the intermediate, is required after its formation.

One significant aspect of the present invention is that the shape of the desired three-dimensional green body should be fully formed (by depositing the liquid composition to create the intermediate) prior to initiating polymerization of the intermediate. It is believed that by polymerizing each layer of the intermediate substantially simultaneously after the intermediate is formed, the resulting polymerized green body will display less warpage as compared to an intermediate whose layers undergo a phase change (e.g., polymerization, or solidification in the case of a thermoplastic material) prior to the deposition of the next layer.

It is further preferred that the polymerization of the intermediate during the heating step be undertaken so that the temperature of the multi-layered intermediate increases substantially uniformly throughout intermediate during heating until the initiation temperature is reached. That is, after the intermediate is formed, its temperature is advantageously raised substantially uniformly throughout the intermediate until the temperature reaches that at which the thermally-polymerizable components will polymerize. When a thermally-activated polymerization initiator is present, this will typically be the temperature when the initiator is activated. The uniform temperature increase is thought to assist in providing for substantially simultaneous polymerization of the intermediate, which in turn provides a decrease in the degree of warping present in the finished green body.

After heating, resultant shaped, solid product may be cooled to ambient temperature. The product at that stage is in a wet, green condition in that it contains liquid, such as a solvent or other carrier. Such wet, green products nevertheless exhibit good strength and toughness. The wet, green product may subsequently be heated in order to substantially remove any solvent or other liquid present therein and provide a dry product. Although the specific temperature and time necessary for drying the product depends on the specific thermally-polymerizable components and other materials included in the liquid composition, generally, drying may be effected by heating at a temperature greater than about 130° C., and preferably at approximately 150° C., in an oven for a period greater than about two hours, preferably for a period of from about two to about six hours As a further means of reinforcement, fibers may be added to the liquid composition so that the resulting green body possesses fiber-reinforcement. Fibers suitable for use in connection with the inventive method may consist of any material that functions to reinforce the three-dimensional body. Advantageously, glass and carbon fibers are used, with carbon fibers being preferred. The amount of fibers added to the composition may vary, but should not be in an amount that would cause them to be unevenly distributed within the composition, e.g., they agglomerate in the composition and exist in clumps when deposited.

If used, the reinforcing fibers may advantageously be present from about 3 vol. % to about 40 vol. %, based upon the total volume of the liquid composition and fiber (and any other particles, e.g., ceramic particles). Preferably, the fibers may be present from about 3 vol. % to about 15 vol. %, and are most preferably present in an amount of about 7 vol. %.

It is often desirable to prepare a ceramic-laden green body which may be fired to provide a sintered ceramic three-dimensional body. In order to provide such a product, sinterable ceramic particles may be added to the aforedescribed liquid composition, in place of or in addition to the fibers, creating what may be conveniently described as a suspension. In such a case, the liquid composition functions as, in essence, a low viscosity vehicle for the ceramic particles, as well as for any other solid particles that may additionally be present, e.g., reinforcing fibers. When heated, the polymerizable components polymerize and form a firm, strong polymer matrix which immobilizes the ceramic powder, which matrix is subsequently fired to provide the sintered ceramic body.

Any type of sinterable ceramic particles may be incorporated into the liquid composition including, but not limited to, alumina, fused silica, magnesia zirconia, spinels, mullite, glass frits, tungsten carbide, silicon carbide, boron nitride, silicon nitride, and mixtures thereof. Ceramic particles, if included in the composition, may advantageously be present from about 20 volt to about 70 vol. % based upon the total volume of the liquid composition and ceramic particles. Preferably, the particles may be present from about 35 vol. % to about 60 vol. %, and most preferably are present at about 50 wt. %. These levels of solids loading allow the green body provided thereby to yield, after sintering, a mechanically-sound sintered ceramic part When ceramic particles are added to the liquid composition, a dispersant is also advantageously added thereto. This component, as the name implies, assists in dispersing the particles throughout the liquid composition. Various dispersants for ceramic particles are known in the art and are appropriate for use in the present invention. However, a dispersant should be selected which does not interact with the other components of the liquid composition, particularly the polymerization initiator or any solvent. A particular dispersant may be evaluated for suitability with a particular ceramic particle and a particular liquid composition by mixing small amounts of the respective components and judging the flow properties of the resultant mixture, whether the resultant mixture exhibits a notable yield point, and/or whether the mixture is dilatant. Preferred dispersants include ethoxylated alkylphenol dispersants, with Triton X-100 (an ethoxylated octylphenol from Rohm & Haas Company) being most preferred. If included in the composition, the dispersant may advantageously be present from about 10 wt. % to about 40 wt. %, preferably from about 15 wt. % to about 30 wt. %, and most preferably is present at about 20 wt. %, based upon the total weight of the liquid composition.

One surprising aspect of the inventive method is that it further advantageously provides a means by which relatively high particulate loading levels can be achieved, without sacrificing the ability to provide a well-defined, three-dimensional body. This may be accomplished by including at least one reinforcing ceramic particle precursor in the liquid composition either without, or in addition to, ceramic particles. Precursors of this type are typically provided in the form of alkoxy compounds, which are easily dispersible in the liquid compositions. When subjected to certain conditions, these precursors will form solid, reinforcing ceramic particles. Thus, one is able to provide a heavy particulate load in the final body, without facing the problem of maintaining the proper dispersion of such particles in the liquid composition (as would be the case if an equivalent level of fully-formed ceramic particulates were introduced into the composition).

Such precursors may advantageously be added to the composition in amounts ranging from about 5 vol. % to about 30 vol. % of the total volume of the liquid composition and other solid components added thereto (e.g., ceramic particles, fibers, etc.) , preferably in amounts ranging from about 10 vol. % to about 20 vol. %, and most preferably in amounts of about 15 vol. %. As mentioned previously, such precursors may be further added to a composition which already contains ceramic particles therein. This technique will provide a body formed with ceramic particulate levels that are in excess of those that one would be able to prepare by introducing ceramic particles alone into the composition during its preparation.

The precursors are advantageously selected from the group consisting of silica-based alkoxide precursors, titania-based alkoxide precursors, and zirconia-based alkoxide precursors, with silica-based alkoxide precursors being preferred. An example of such a preferred alkoxide precursor is tetraethoxysilane. These precursors, in the presence of water (advantageously provided after deposition of the composition by exposing the body to steam in a molar ratio of about 1:4) and heat, will hydrolyze to form solid, reinforcing ceramic particles One example of a liquid composition which may be used in the foregoing method, either with or without fiber, ceramic particles, or ceramic particle precursor loading, comprises at least one multifunctional monomer or oligomer. This multifunctional component should be present in the liquid composition in an amount sufficient to provide the intermediate with sufficient shape retention after polymerization.

Advantageously, the multifunctional monomer and/or oligomer will include at least two functional groups, for example, vinyl or allyl groups, or mixtures thereof. In accordance with a more advantageous embodiment of the present invention, the liquid composition includes at least one multifunctional acrylate monomer and/or oligomer. In a preferred embodiment, the acrylate is provided as a solution comprised of a mixture of at least two multifunctional acrylate monomers, preferably solubilized in a solvent for the monomers. Most preferably, the monomers will comprise trimethylol propane triacrylate (TMPTA) and hexanedioldiacrylate (HDODA).

Generally, the type and amount of monomer and/or oligomer included in the composition determines the degree of hardness of the resulting solid, shaped product. An exceptionally hard green product can typically be formed using an appropriate monomer and/or oligomer in an amount ranging up to about 75 wt. % of the composition. Advantageously, however, lesser amounts may be used successfully, the monomers and/or oligomers being present from about 0.1 wt. % to about 55 wt. % of the liquid composition and preferably up to only about 40 wt. % thereof, based upon the weight of the liquid composition. When the preferred monomers are used, TMPTA is advantageously present in an amount ranging from about 1 wt. % to about 15 wt. %, preferably from about 4 wt. % to about 8 wt. %, and most preferably at about 6 wt. %, and HDODA is advantageously present in an amount ranging from about 10 wt. % to about 70 wt. %, preferably from about 40 wt. % to about 55 wt. %, and most preferably at about 50 wt. %, based upon the weight of the liquid composition.

If desired, and as mentioned previously, an organic solvent may be included in the liquid compositions. In such a case, the organic solvent may comprise any organic solvent will solvate the multifunctional monomers and/or oligomers, exhibits a low vapor pressure at the temperature at which the multifunctional monomers and/or oligomers polymerize and crosslink, and exhibits a relatively low viscosity. Preferred solvents include, but are not limited to, phthalate esters, dibasic esters, high-boiling point petroleum solvents, long chain alcohols, and pyrrolidones. A dibasic ester solvent is most preferred. Generally, if included, the solvent is advantageously present in an amount ranging from about 10 wt. % to about 40 wt. %, preferably from about 15 wt. % to about 30 wt. %, and most preferably at about 20 wt. %, based upon the weight of the liquid compositions A polymerization initiator may also be advantageously added to the liquid composition. This component functions to initiate the polymerization of the thermally-polymerizable components when the intermediate is heated. Various thermally-activated initiator compounds are known in the polymer art and are suitable for use in the method of the present inventions. Free-radical initiator compounds are preferred, and include organic peroxides and hydroperoxides and azo or diazo compounds, with benzoyl peroxide being most preferred. The free-radical, thermally-activated initiators are generally inactive at ambient temperatures so that the shelf-life of the composition is relatively long. However, once the composition containing the thermally-polymerizable components is heated, the reaction rate of the initiator compound is relatively high, with polymerization of the components being easily and quickly achieved. The initiator is advantageously present in an amount ranging from about 0.1 wt. % to about 5 wt. %, preferably from about 0.1 wt. % to about 3 wt. %, and most preferably at about 2 wt. %, based upon the weight of the liquid composition.

A further aspect of the present invention provides a method for the preparation of a directionally-aligned-fiber reinforced three-dimensional body. The method comprises passing a fiber-laden suspension having a viscosity of at least about 10 poise and comprising fibers and thermally-polymerizable components through a flow passage of a nozzle. The flow passage of the nozzle is configured so that the fibers are oriented substantially parallel to each other and substantially in the direction of suspension movement relative to the nozzle as the suspension passes through the flow passage. After the suspension exits the nozzle, it is deposited onto a base in a predetermined pattern to form a layer of the suspension on the base. Simultaneously with the deposition of the suspension onto the base, the nozzle and base are moved relative to one another, e.g., by moving the base and/or the nozzle, so that the fibers in the deposited layer are aligned substantially parallel to the direction of relative movement of the nozzle. After the deposition is completed, the layer is heated to cause the thermally-polymerizable components to polymerize, thereby providing a three-dimensional body having directionally-aligned-fiber reinforcement.

It was discovered that the orientation of the fibers within the nozzle could be controlled by subjecting the suspension to an appropriate degree of shear stress as it passes through the nozzle's flow passage. Advantageously, the flow passage is configured as a convergent (straight taper) nozzle, having a gauge of from about 15 (I.D. 1.37 mm), through 20 (I.D. 0058 mm) and to about 23 (I.D. 0.33 mm), and the suspension is passed therethrough at a pressure ranging from about 5 to about 60 psi. Determining the configuration of the flow passage to achieve the aforesaid alignment in any given suspension may be completed by performing rheological modeling, using appropriate methods well known in the art.

The fibers will typically be present in the suspension in an amount sufficient to provide the resulting green body with enhanced mechanical properties. Generally, this will require the use of at least about 1 vol. % to about 40 vol. % of fibers in the suspension, and preferably from about 3 vol. % to about 15 vol. % of the suspension.

Fibers suitable for use in connection with the inventive method may consist of any material that functions to reinforce the three-dimensional body. Advantageously, glass and carbon fibers are used, with carbon fibers being preferred. Such fibers will preferably have a diameter ranging from about 5 $\mu$m to about 30 $\mu$m. Fibers outside this size are difficult to process. The fibers should further preferably possess a length ranging from about 2 mm to about 5 mm. Fibers that are outside this size range will tend to clump together within the suspension. An example of such preferred carbon fibers include chopped AS-4 fibers (Hercules Corporation).

The ultimate orientation of the fibers within the deposited layer was found to be effected by, at least, the orientation of the nozzle during deposition. Thus, the inventive method allows one to create a fiber-reinforced body in which the fibers are aligned substantially parallel with each other, while further enabling the orientation of such fibers within the body to be controlled.

If desired, the deposition step can be repeated by depositing at least one further layer of the suspension onto a previously-formed layer in a predetermined pattern to form a multi-layered intermediate as in the prior inventive aspect. Simultaneously with the deposition of the suspension onto the previously formed layer, the nozzle and base are advantageously moved relative to one another so that the fibers in each further deposited layer are aligned substantially parallel to the direction of relative movement of the nozzle.

After the multi-layered intermediate is prepared, it may be heated to cause the thermally-polymerizable components to polymerize, thereby providing a three-dimensional body having directionally-aligned-fiber reinforcement. As in the prior aspect of the present invention, and for the reasons described previously, it is preferable that, during the heating step, the average temperature of the multi-layered intermediate increase at a substantially uniform rate.

For the reasons described previously, deposition of the suspension is preferably completed using a positive displacement extruder, and the suspension is further preferably degassed prior to being deposited.

Suspensions having a viscosity of at least about 100 poise, and more preferably at least about 200 poise, are advantageously used in the preparation of the directionally-aligned-fiber reinforced bodies. As discussed previously, it was found that the higher viscosity compositions hold the fibers in substantially the same location after deposition through polymerization of the composition. Moreover, the higher viscosity (in combination with the proper configuration of the flow passage) was found to create sufficient shear stress in the suspension to orient the fibers substantially parallel to each other and substantially in the direction of suspension movement relative to the nozzle as the suspension passes through the flow passage.

The composition of the suspension may comprise the liquid composition as described in the prior aspect of the present invention. Of course, other suitable liquid compositions which include thermally-polymerizable components may also be used successfully in the inventive method, including all of the compositions described herein.

Further, and if desired, ceramic particles and/or ceramic particle precursors may also be introduced into the suspension, advantageously at the levels described previously herein, to provide a fiber and ceramic reinforced three-dimensional body.

Another aspect of the present invention provides a composition that can be used to prepare three-dimensional polymer matrix composites. The composition comprises at least one urethane acrylate oligomer, at least one vinyl monomer and/or oligomer, and having a viscosity of at least 10 poise.

It was found that the use of urethane acrylic oligomers in the liquid composition provided further, and surprising, benefits, when preparing three-dimensional bodies using free-form techniques. Specifically, the oligomers provided a body having excellent mechanical properties, while further polymerizing quickly and at relatively low temperatures. These oligomers generally comprise polyurethane chains having an acrylate group at each end. The urethane functional groups were found to add strong hydrogen bonding to the body, providing the body with strength, but further provide a relatively flexible chain which provides the body with toughness.

The polyurethane chains in the preferred oligomer have a molecular weight ranging from about 100–500 Daltons. Examples of such preferred urethane acrylate oligomers are Sartomer CM 961 and CH 966, both available from Sartomer Corporation (Exton, Penn.). The former is described as a resilient aliphatic urethane acrylate resin, and the latter as a highly flexible aliphatic urethane acrylate resin. This component may advantageously be present from about 20 wt. % to about 70 wt. %, based upon the total weight of the liquid composition. Preferably, it may be present from about 30 wt. % to about 60 wt. %, and most preferably is present in an amount of about 55 wt. %.

The inclusion of vinyl monomers in the inventive composition were found to further improve the mechanical properties of the body prepared therefrom. Specifically, the vinyl monomers were found to add flexibility to the body because they add sections to the polymerized chain that cannot be cross-linked. The vinyls were further discovered to be very compatible with the other components of the composition. N-vinylpyrrolidone was determined to be the preferred vinyl because it not only provided the aforesaid flexibility, but provided the polymerized chain with additional hydrogen bonding capability. This particular vinyl also possessed low volatility as compared to other vinyl monomers, which added to the stability of the composition after deposition. The vinyl component may advantageously comprise about 10 wt. % to about 70 wt. %, preferably form about 15 wt. % to about 40 wt. %, and most preferably about 23 wt. % of the composition.

Additional improvement in the mechanical properties of a three-dimensional body prepared using the inventive composition were discovered when difunctional cross-linking monomers were included in the composition. These monomers, as their name implies, function to cross-link the polymer chains formed from the reaction of the urethane acrylate oligomers and the monofunctional vinyl monomers and/or oligomers. Use of this agent was found to increase both the toughness and strength of the resulting body. Cross-linking agents may be advantageously used in the present invention include hexanedioldiacrylate, trimethylolpropane-triacrylate, neopentylglycoldiacrylate, tetraethylene-glycoldiacrylate, divinylbenzene, vinylbenzylchloride, and mixtures thereof, with hexanedioldiacrylate being the preferred agent.

The cross-linking monomers should be present in an amount which provides the body with sufficient stiffness, and therefore strength, but not to the extent that the body becomes brittle. Advantageously, then, the composition may include from about 5 wt. % to about 40 wt. %, preferably from about 10 wt. % to about 30 wt. %, and most preferably about 23 wt. %, based upon the weight of the liquid composition.

In order to enhance the polymerization of the composition, an initiator, which initiates such polymerization, is advantageously included therein. Preferably, however, the initiator should be of the thermally-activated type. This allows one to have a degree of control over the time at which the deposited composition is polymerized. This control is particularly important if one desires to prepare a three-dimensional structure using the composition which must be formed from a plurality of liquid composition layers. As stated previously the adhesion of one layer to the other is one factor which affects the overall integrity of the body and, by effecting polymerization of all layers at substantially the same time after the entire multi-layered structure is deposited, the layers are very strongly adhered to each other.

Preferred thermally-activated initiators which release free radicals include methylethylketone peroxide and azoisobutyronitrile, with the latter being most preferred. Azoisobutyronitrile decomposes to release the free radicals at an increasing rate as the temperature of the body, and therefore the initiator, reaches about 100° C.

The initiator should be present in an amount that is sufficient to provide an appropriate level of polymerization throughout the deposited composition. This amount may advantageously range from about 0005 wt. % to about 2 wt. %, preferably from about 0.05 wt. % to about 1 wt. %, and most preferably at about 0.3 wt. %, based upon the weight of the liquid composition.

It was further discovered that warpage in the finished body could be further reduced if the deposition layers were maintained at a relatively uniform temperature prior to initiation of the polymerization reaction. In fact, the more uniform the temperature, the less warpage was experienced in the polymerized body. While the most advantageous temperature will vary depending upon the components included in the composition, the temperature of the multi-layered body prior to initiation should vary by no more than about 20° C., and preferably by less than about 10° C.

In order to provide the composition with the appropriate viscosity for use in free-forming techniques, e.g., allowing the deposited layers to be neatly laid up, with good edge retention, it is typically necessary to add a viscosifier to the composition. While the solids level of the composition may serve to increase the viscosity of the composition, this presents no problem. The amount of viscosifier may, in such a case, be simply adjusted to provide the desired results. The viscosity of the composition should be at least about 10 poise, preferably be above about 100 poise, and most preferably exceed about 200 poise.

The viscosifier useful in connection with the inventive composition is also useful as a viscosity enhancer in the inventive methods described herein. The viscosifier is advantageously selected from the group consisting of non-reinforcing silica-based materials, and preferably comprises fumed silica (e.g, Cab-O-Sil EH-5, Cabot Corporation). When used, this component may typically advantageously range from about 0.05 wt. % to about 5 wt. %, preferably from about 0.05 wt. % to about 3 wt. %, and most preferably at about 2 wt. %, based upon the weight of the liquid composition.

As an example of the foregoing "other component" that, aside from its primary purpose, functions to raise the viscosity of the inventive composition (or any of the compositions described herein used to form three-dimensional bodies), there are reinforcing ceramic particles. These particles may advantageously be included in the composition as a means of providing further strength to any three-dimensional body formed using the composition.

The ceramic particles useful in all aspects of the present invention are preferably a size which aids their substantially even distribution throughout the composition and, ultimately, in the body formed therefrom. The particles may be selected from the same group as described previously in connection with another aspect of the invention, however, any such ceramic particles used in this composition need not be sinterable. This is because the composition contains urethanes which, when exposed to high temperatures, create toxic fumes. Thus, the urethane-containing compositions of the present invention, even when loaded with ceramic particles, are not intended to be fired. If such ceramic particles are included in the composition, they may be advantageously present in an amount ranging from about 10 vol. % to about 50 vol. %, preferably from about 20 vol. % to about 40 vol. %, and most preferably at about 30 vol. %, based upon the combined volume of the liquid composition and the reinforcing solids therein (e.g., ceramic particles, fibers, etc.)

Ceramic particle precursors, as described previously in connection with another aspect of the present invention, may also advantageously be added to the liquid composition in addition to, or in place of, either fibers or ceramic particles. If present, the precursors may advantageously be present in amounts ranging from about 5 vol. % to about 30 vol. % of the total volume of the liquid composition and other solid components added thereto (e.g, ceramic particles, fibers, etc.), preferably in amounts ranging from about 10 vol. % to about 20 vol. %, and most preferably at about 15 vol. %.

In place of the ceramic particles and ceramic particle precursors, or in addition to either or both of those reinforcing materials, fibers may be introduced into the composition as a further reinforcing means. Those fibers described previously in connection with another aspect of the present invention may be used with good results in this aspect. The amount of fibers that may be included in the liquid composition may advantageously range from about 3 vol. % to about 10 vol. %, preferably from about 5 vol. % to about 8 vol. %, and preferably be about 7 vol. %, based upon the total combined volume of the liquid composition and fibers (as well as other solids, e.g, ceramic particles).

After the inventive composition described previously is prepared, another aspect of the present invention is the use of that composition to prepare a three-dimensional polymer matrix composite. Such a composite may be prepared by depositing that liquid composition onto a base in a predetermined pattern to form a layer of the liquid composition on the base, and subsequently heating the layer to cause the thermally-polymerizable components to polymerize, thereby providing a three-dimensional polymer matrix composite. The deposition step may be repeated prior to the heating step, if desired, to provide a multi-layered intermediate. This intermediate may then be polymerized to provide a three-dimensional polymer matrix composite therefrom.

All of the processing techniques discussed in connection with the other aspects of the present invention may be used successfully in connection with this method of preparing a polymer matrix composites e.g., degassing, maintaining the deposited intermediate at a substantially uniform temperature prior to polymerization, polymerizing all of the layers comprising a multi-layered intermediate formed using the composition substantially simultaneously, and increasing the temperature of the multi-layered intermediate substantially uniformly throughout the body during heating until the initiation temperature is reached.

Three-dimensional bodies prepared in accordance with the inventive methods, as described herein, also comprise an aspect of the present invention.

The preparation of three-dimensional bodies in accordance with the various methods of the present invention can be undertaken using any suitable apparatus. Preferably, however, a computer-controlled three-dimensional gantry system, which operates in coordination with a controllable composition dispenser, is used. An example of such a preferred system is provided in FIG. 1. In that exemplary system, there is provided a stationary table 1, about which there is located a screw-driven gantry system 2. A preferred gantry system is Model No. HL32SBM201206704, available from Techno/Isel USA Division, New Hyde, N.J. The gantry system allows movement in three axes (X, Y and Z) using stepper motors 3, 4, 5. Each motor is independently-controllable by a computer (not shown).

The dispenser 6, which advantageously comprises a positive displacement extruder having a nozzle attached at its outlet, and preferably a screw-actuated piston-type extruder, is mounted on the Z-axis. Such positive displacement extrusion devices offer the advantages of accurate control over dispensing rates and volumetric flow of the composition over other types of deposition devices, such as air powered dispensers.

The discharge of the composition from the extruder is activated by a stepper motor 7, this motor also being independently controllable by the computer. A heatable platen 8 is used as the deposition surface, and is located on the stationary table 1. A plate may also be placed upon the platen and used as the deposition surface, if desired.

The general procedure for preparing a desired three-dimensional body in accordance with any of the methods described herein using the previously described apparatus is as follows. Initially, a drawing of the desired body 9 is prepared on a CAD system 10. The drawing is then sectioned horizontally using appropriate layering software 11. The computer then translates each horizontal section of the virtual image into motion instructions, which are then converted into indexer commands by the stepper motor controllers 12, 13, 14, 15, (Compumotor AT4600) which are distributed to the appropriate stepper motor. This results in movement of the nozzle along a horizontal path, and the simultaneous dispensing of the liquid composition from that nozzle onto the platen 80. If preparation of a multi-layered structure is desired, the appropriate instruction is then entered into the computer to raise the nozzle relative to the previously deposited layer, and the deposition of the subsequent horizontal section begins as before, only this time the material is deposited onto a prior layer. After the deposition is completed, the platen may then be heated to cause polymerization of the composition. A more detailed description of a similar apparatus and methodology can be found in U.S. Pat. No. 5,121,329.

If desired, more than one computer-controllable dispenser can be used to prepare a three-dimensional object in accordance with the present invention For example, two or more dispensers, each of which includes a nozzle, can be used to deposit material onto different portions of a three-dimensional body being formed on a base. Further, each dispenser may contain the same, or different, liquid compositions. For example, one composition may comprise the same vehicle (liquid carrier composition), but different ceramic particle and/or fiber loading levels. Alternatively, different vehicles entirely may be used. If such different compositions are used, various additional advantages are obtained. For example, a three-dimensional object could be prepared which possess one type of mechanical properties in a given area, and different mechanical properties in another area.

The dispensing heads could be controlled so that they operated simultaneously over different portions of the object being formed, or alternatively so that only one head was in operation at a time.

The following examples further illustrate the present invention but, of course, should not be construed as in any way limiting its scope.

COMPARATIVE EXAMPLE A

In the course of evaluating various materials as a carrier (or vehicle) for the ceramic particulate in the preparation of green ceramic-laden bodies using free-forming techniques, a paraffinic wax was tested. This wax was selected for testing because it possessed a low viscosity when melted and has excellent "burn out" characteristics (i.e., it leaves little residue after sintering of a ceramic-reinforced green body). Alumina powder was used as the ceramic reinforcing particle.

Because alumina powder exhibits highly polar surface chemistry as compared to the paraffin wax, the powder was pretreated with a solution of stearic acid (2 wt. % based upon the mass of the alumina powder) dissolved in toluene (this acting to assist the compatibility of the two materials).

A measured amount of wax was then melted in a beaker, followed by the addition of the stearic acid-treated alumina to the molten wax. However, the batch was not fluid enough to be poured from the beaker when the amount of solids in the dispersion exceeded 20.7 vol. % of the wax. Further experiments were not conducted with this wax system due to the low solids loading and associated shrinkage of the part during firing.

EXAMPLE 1

This is an example of the methodology employed in preparing polymer matrix composites and compositions that can be used to prepare such composites in accordance with the present invention.

A liquid composition was prepared by combining, in the order in which they are listed, the components identified in Table A.

TABLE A

| Component | Weight Percent |
|---|---|
| Hexanedioldiacrylate | 22.9 |
| N-vinylpyrrolidone | 22.7 |
| Azobisisobutyronitrile | 0.3 |
| Sartomer CN 961[1] | 54.1 |

[1]Sartomer CN 961 is a resilient aliphatic urethane acrylate resin available from Sartomer Corporation (Exton, Pennsylvania).

Fumed silica (Cab-o-Sil EH-5, available from Cabot Corporation), in an amount of 1.66 vol. % of the composition, was added to raise the viscosity of the composition to about 10 poise.

The composition was then divided into seven portions, and silica particles (Min-U-Sil, U.S. Silica Corp.) were introduced therein by milling and repeatedly shearing the blend. The particles were added in the following amounts: 0, 3.75, 7.5, 11.23, 15.0, 22.5, and 30.0 vol. %, based upon the total volume of the composition and particulates.

Each of the seven compositions was extruded onto a heatable platen (the platen being held at a temperature of about 85° C. during the deposition) using the computer-controlled gantry system described previously herein to form a bar having a nominal dimension of 3 mm×50 mm×4 mm. Each bar was formed by layering the composition (each layer being about 0.48 mm×0.48 mm in thickness). The composition was then polymerized by heating the platens and then allowed to cool. Three bars of each composition were prepared, and the results of the following mechanical strength tests averaged.

Each bar was mounted onto a screw-driven testing machine (Intron), and flexure tests were conducted on each bar. While the flexure testing used does not give true strength values for non-brittle material (e.g., the compositions of the present invention) it was nevertheless used because it is a convenient method for identifying the mechanical properties of the body. The tensile modulus for each body was derived from the initial linear portion of the stress-strain curve, as set forth in FIG. 2. The true tensile strength was then derived from, and is at least as great as, the maximum stress in the linear portion of the stress-strain curve.

TABLE B

| Comp. No. | Vol. % silica | Max. Displ. (MPa) | Max. Stress (MPa) | Flexure Modulus (GPa) |
|---|---|---|---|---|
| 1 | 0 | 2.57 | 38.3 | 0.96 |
| 2 | 3.75 | 3.05 | 42.8 | 1.03 |
| 3 | 7.5 | 3.12 | 48.8 | 1.15 |
| 4 | 11.23 | 3.16 | 54.9 | 1.39 |
| 5 | 15.0 | 2.99 | 58.2 | 1.56 |
| 6 | 22.5 | 2.34 | 75.1 | 2.56 |
| 7 | 30.0 | 1.64 | 61.5 | 2.89 |

The bars containing less than 20 vol. % silica tended to flax without fracturing. The bars with a silica content above that level tended to fracture, demonstrating brittle behavior.

EXAMPLE 2

This example demonstrates the preparation of ceramic-laden green bodies in accordance with the present invention.

Seven liquid compositions (1–7), with ceramic particle-loading, were prepared by combining the components identified in Table C.

TABLE C

| Component Composition | Percent | | | | | | |
|---|---|---|---|---|---|---|---|
|  | 1 | 2 | 3 | 4 | 5 | 6 | 7 |
| TMPTA* | 0 | 3.8 | 3.6 | 3.6 | 3.2 | | |
| HDODA* | 29.6 | 38.3 | 34.5 | 32.8 | 31.3 | 28.2 | 27.9 |
| DBE*[1] | 32.9 | 13.1 | 39.5 | 11.2 | 10.7 | 9.7 | 9.5 |
| Triton X-100* | 7.8 | 10.1 | 10.3 | 9.8 | 9.3 | 10.8 | 10.5 |
| $Al_2O_3$** | 6.2 | 34.0 | 39.5 | 42.5 | 45.1 | 47.7 | 48.9 |
| Mill Time (hours) | 24 | 24 | 21 | 21 | 41 | 49 | 49 |
| Density (g/ml) | 1.54 | 1.75 | 2.01 | 2.00 | 2.16 | 2.19 | 2.23 |
| Viscosity (poise) | 6 | 12 | 29 | 50 | 112 | 127 | 146 |

*in weight percent based upon the liquid composition (all components, less the $Al_2O_3$).
**in volume percent based upon the total composition (including the $Al_2O_3$ particles).
[1]A solvent comprising dimethyl gulatarate and succinic esters.

After each formulation was prepared, a thermally-activated polymerization initiator was added (methyl ethyl ketone peroxide) at 1.5 wt. % of the total composition (with the $Al_2O_3$) just prior to deposition of the composition.

The composition was then deposited onto a warm platen. After deposition of a layer, the platen was heated to cause the polymerizable components in the composition to polymerize. Green parts resulted which exhibited good shape retention during polymerization.

It was further found that the presence of oxygen during the deposition process inhibited any extraneous polymerization of the layers, assisting in providing good layer-to-layer bonding.

When parts were prepared using a composition having an approximate composition as set forth in Run 7 of Table C above, but having 52.8 vol. % Al₂O₃ loading, superior results were observed in the final, sintered, products. Several sintered test bars prepared using that composition exhibited, under a standard 3 point bend test, an average flexural strength of 606 HPa and a flexure modulus of 3.58 GPaa and had a density of 3.85 g/cc (3.97 g/cc being the theoretical maximum for a fully-dense Al₂O₃ article).

EXAMPLE 3

This example demonstrates the preparation of polymer matrix composites having fiber reinforcement in accordance with the present invention.

The liquid composition set forth in Table A of Example 1 was prepared. Carbon fibers (AS-4, Hercules Corporation) were then chopped to a length of about 3–4 mm, and then an amount of such fibers constituting 7 vol. % of the total composition and fibers was milled into the resin. The milling was a delicate operation because excessive milling reduced the fiber aspect ratio excessively, causing the fibers to be ground into particles. In contrast, under milling did not break up the fiber balls or clusters which would create blockage in the nozzle during extrusion.

Fumed silica (Cab-o-Sil EH-5, available from Cabot Corporation), in an amount of 1.66 vol. % of the composition, was also added to the composition prior to incorporation of the fibers therein, raising the viscosity of the composition to about 10 poise. This increase in viscosity assisted in creating shear stresses in the composition as it passed through the needle to the extent that the fibers were oriented in substantially the same direction at the point where the composition exited the nozzle.

The fiber-laden composition was then extruded to provide two bars. The bars were then polymerized and subsequently tested, all in the same manner as described in Example 1. The average mechanical properties of the two bars was as follows:

| | | |
|---|---|---|
| Maximum displacement | 1.73 | MPa |
| Maximum Stress | 27.0 | MPA |
| Flexure Modulus | 1.24 | GPa |

EXAMPLE 4

This example demonstrates the preparation of a polymer matrix composite using ceramic particle precursors and ceramic particles as reinforcing materials in accordance with the present invention.

A liquid composition in accordance with the present invention was prepared by combining, in the order in which they are listed, the components identified in Table D.

TABLE D

| Component | Weight Percent |
|---|---|
| Hexanedioldiacrylate | 15.3 |
| N-vinylpyrrolidone | 20.3 |
| Azobisisobutyronitrile | 0.2 |
| Sartomer CN 961² | 36.5 |
| Water | 6.9 |
| Tetraethoxysilane (TEOS) (in vol. %) | 20.8 |

Fumed silica (Cab-o-Sil EH-5, available from Cabot Corporation), in an amount of 1.66 vol. % of the composition, was added to raise the viscosity of the composition to about 10 poise. The composition was further provided with reinforcing silica particles (Min-U-Sil, U.S. Silica Corp.) in an amounts of about 15 vol. %.

The composition was then deposited in the manner set forth in Example 1 to form three bars. After deposition, the deposited compositions were polymerized by exposure to a heated, steam-laden environment for 24 hours, during which time the temperature of the deposited composition was maintained at a temperature of 140° C. This caused the TEOS to hydrolyze and form ceramic particulates within each bar. Due to the loss of ethanol and water during the hydrolysis, however, a net volumetric shrinkage of the material was noted, averaging about 15.3 vol. % in each bar. This shrinkage results in a combination of bulk shrinkage and porosity formation. Further noted was the introduction of voids into the bar. The voids are thought to be introduced into the bar during the shrinkage of the TEOS during the hydrolysis and formation of the ceramic particulate. The presence of such voids may be desirable in applications in which fluid transport is beneficial, such as bone replacements.

After the bars were cooled, they were subjected to the same mechanical testing as set forth in Example 1. The results of the testing on each bar were averaged, yielding the following average values:

| | | |
|---|---|---|
| Maximum displacement | 1.75 | MPa |
| Maximum Stress | 50.4 | MPa |
| Flexure Modulus | 2.10 | GPA |

Figure 2:
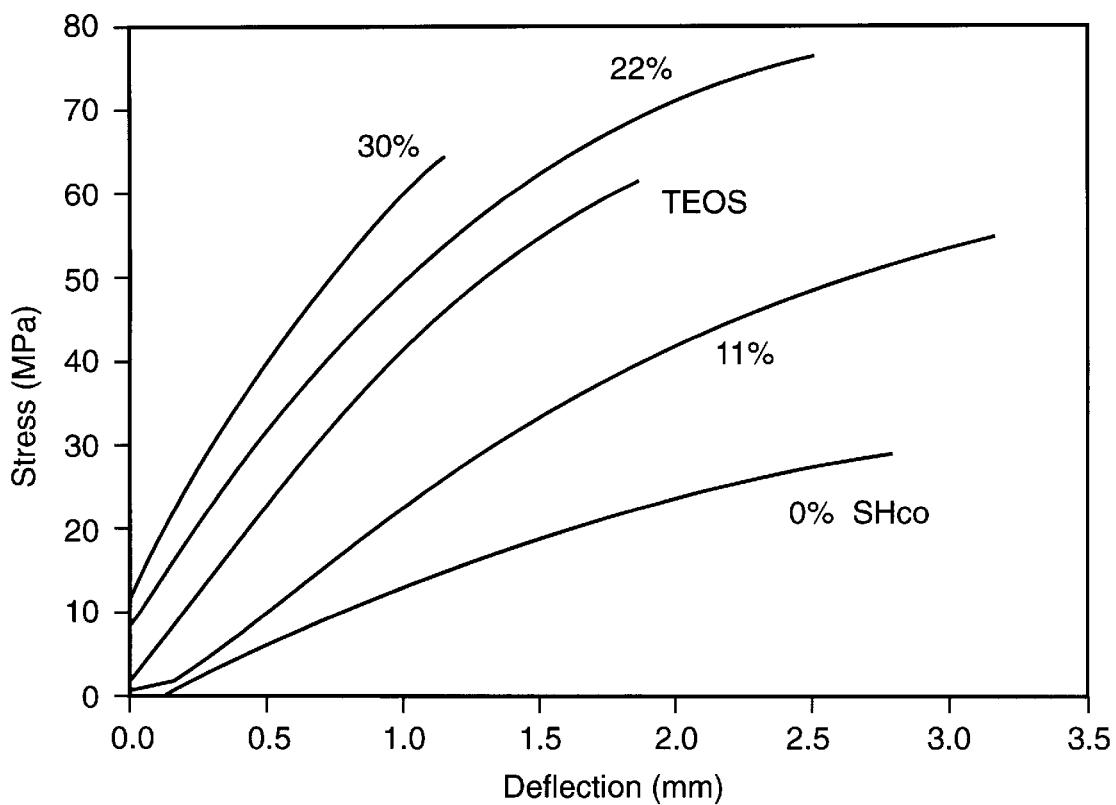
FIG. 2 sets forth several stress-strain curves for three-dimensional bodies prepared using certain ceramic-particle-loaded suspensions using the methods of the present invention.

The results of the testing set forth in the previous examples demonstrate that ceramic reinforcement of the urethane acrylate composition increased the modulus and decreased the ultimate strain of the body. As Table B demonstrates, a three-fold increase in modulus was obtained for the 30 vol. % silica composition compared to the unreinforced body. Furthers and as shown in FIG. 2, the load deflection curves for the alkoxide impregnated composition (using TEOS) was comparable to the same composition having silica particulate loading, but without the dispersion problems associated with incorporating particulates into the composition prior to deposition.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method for preparing a three-dimensional green body comprising
    passing a first liquid composition having a viscosity of at least about 10 poise and comprising thermally-polymerizable components through a dispensing head and onto a base in a predetermined pattern to form a layer of the first liquid composition on the base,
    passing a second liquid composition through a dispensing head and onto the previously-formed layer of the first liquid composition in a predetermined pattern to provide a multi-layered intermediate,
    heating the multi-layered intermediate to cause the thermally-polymerizable components in the first and second liquid compositions to polymerize, wherein the first and second liquid compositions are the same or different.

2. The method according to claim 1, wherein during the heating step, the temperature of the multi-layered intermediate increases substantially uniformly throughout intermediate during heating until the initiation temperature is reached.

3. The method according to claim 2, wherein the multi-layered intermediate is heated by applying heat to the base.

4. The method according to claim 1, wherein at least one liquid composition is degassed prior to deposition.

5. The method according to claim 1, wherein at least one liquid composition has a viscosity of at least about 100 poise.

6. The method according to claim 1, wherein at least one liquid composition is deposited by a positive-displacement extruder.

7. The method according to claim 6, wherein at least one liquid composition is deposited by a screw-actuated, piston-type, positive-displacement extruder.

8. The method according to claim 1, at least one liquid composition further comprising ceramic particles.

9. The method according to claim 8, at least one liquid composition further comprising reinforcing fibers.

10. The method according to claim 1, at least one liquid composition further comprising reinforcing fibers.

11. The method according to claim 8, further comprising heating the multi-layered intermediate at a temperature which sinters that ceramic particles.

12. The method according to claim 8, wherein during the heating step, the temperature of the multi-layered intermediate increases substantially uniformly throughout the intermediate during heating until the initiation temperature is reached.

13. The method according to claim 1, wherein the thermally-polymerizable components comprise at least one multifunctional monomer.

14. The method according to claim 13, wherein the at least one multifunctional monomer comprises at least one acrylate monomer.

15. The method according to claim 14, at least one liquid composition further comprising at least one polymerization initiator and a solvent for the at least one acrylate monomer.

16. The method according to claim 15, wherein the viscosity of at least one liquid composition is at least 100 poise.

17. The method according to claim 16, wherein the at least one acrylate monomer is present in the liquid composition an amount ranging from about 0.1 wt. % to about 55 wt. %.

18. The method according to claim 17, wherein the at least one acrylic monomer comprises a mixture of trimethylol propane triacrylate and hexanedioldiacrylate.

19. The method according to claim 18, at least one liquid composition further comprising reinforcing fibers.

20. The method according to claim 18, wherein trimethylol propane triacrylate is present in an amount of from about 1 wt. % to about 15 wt. % and hexanedioldiacrylate is present in an amount of from about 10 wt. % to about 70 wt. %.

21. A method for preparing a fiber-reinforced three-dimensional body comprising passing a first fiber-laden suspension having a viscosity of at least about 10 poise and comprising fibers and thermally-polymerizable components through a flow passage of a nozzle, the flow passage being configured so that the fibers are oriented substantially parallel to each other and substantially in the direction of the first fiber-laden suspension movement relative to the nozzle as the first fiber-laden suspension passes through the flow passage, depositing the first fiber-laden suspension after it has passed through the flow passage onto a base in a predetermined pattern to provide a layer of the first fiber-laden suspension on the base, simultaneously with the deposition of the first fiber-laden suspension onto the base, moving the nozzle and base relative to one another so that the fibers in the deposited layer of the first fiber-laden suspension are aligned substantially parallel to the direction of relative movement of the nozzle, and heating the layer to cause the thermally-polymerizable components of the deposited layer of the first fiber-laden suspension to polymerize.

22. The method according to claim 21, further comprising passing a second fiber-laden suspension having a viscosity of at least about 10 poise and comprising fibers and thermally-polymerizable components through a flow passage of a nozzle, the flow passage being configured so that the fibers in the second fiber-laden suspension are oriented substantially parallel to each other and substantially in the direction of the second fiber-laden suspension movement relative to the nozzle as the second fiber-laden suspension gasses through the flow passage, depositing the second fiber-laden suspension after it has passed through the flow passage onto the previously-formed layer of the first fiber-laden suspension in a predetermined pattern to provide a multi-layered intermediate, simultaneously with the deposition of the second fiber-laden suspension onto the previously-formed layer of the first fiber-laden suspension, moving the nozzle and base relative to one another so that the fibers in the deposited layer of the second fiber-laden composition are aligned substantially parallel to the direction of relative movement of the nozzle, and heating the multi-layered intermediate to cause the thermally-polymerizable components to polymerize, wherein the first and second fiber-laden compositions are the same or different.

23. The method according to claim 22, wherein during the heating step, the temperature of the multi-layered intermediate increases substantially uniformly throughout the intermediate during heating until the initiation temperature is reached.

24. The method according to claim 21, wherein at least one suspension has a viscosity of at least about 100 poise.

25. The method according to claim 21, wherein at least one suspension is deposited by a positive-displacement extruder.

26. The method according to claim 21, wherein the fibers comprise from about 1 vol. % to about 40 vol. % of at least one suspension.

27. The method according to claim 21, wherein at least one suspension is degassed prior to deposition.

* * * * *